March 6, 1951  L. A. NICAISE  2,544,038
RECORDING SCALE
Filed March 28, 1946  2 Sheets-Sheet 1

INVENTOR
L. A. NICAISE
BY
ATTYS

March 6, 1951  L. A. NICAISE  2,544,038
RECORDING SCALE

Filed March 28, 1946  2 Sheets-Sheet 2

INVENTOR
L. A. NICAISE
BY Seascrock, Downing & Seebold
ATTYS.

Patented Mar. 6, 1951

2,544,038

UNITED STATES PATENT OFFICE 2,544,038

RECORDING SCALE

Leon Antoine Nicaise, Lambersart-les-Lille, France

Application March 28, 1946, Serial No. 657,832
In France August 27, 1945

4 Claims. (Cl. 265—5)

The present invention relates to an automatic balance allowing precise weighing with a strong printing arrangement completely independent of the weighing system and of the weight-indication dial and indicating at the same time the price payable for the goods weighed, for the unit of price chosen on a keyboard comprising a number of keys corresponding to the unit prices employed, the price to be paid being also registered on the ticket indicating the weight.

It is characterised by the arrangement, parallel to the circular weight-indicating frame or dial, which comprises a contact terminal or stud, of two concentric wheels: one for the weights and the other for the prices to be paid, the weight wheel rigid with an index and driven by an electric motor which stops as soon as the index meets the contact stud of the weight-indicating dial, driving the price wheel by a train of pinions clutched by an electromagnet corresponding to the unit price indicated on a key of a keyboard, the series of clutching electromagnets arranged around the wheel with their own trains of pinions corresponding to the series of unit prices on the keys of the keyboard.

It is further characterised by all or part of the arrangements hereinafter described taken together or separately.

The index rigid with the weights wheel is so arranged as to meet the contact stud of the weight-indicating dial;

An electromagnet locking the scale-beam of the balance in the position of equilibrium while the electric driving operations of the device for indicating the weight and the price payable and for printing the ticket are being effected;

The two wheels for printing the weight and the price payable bear on their edges the stamps, in relief, which will serve to print the ticket;

An electric circuit which is closed by a separate key in order to actuate an electric motor which drives a wheel with three contact strips: the first for actuating the electromagnets effecting the printing of the weight and the price payable; the second which closes the backward-movement circuit of the motor controlling the printing wheels and thus effects their return to the starting point; whereas the third, after having effected one complete revolution, unlocks the key, thus stopping the motor that drives this three contact-band wheel.

A projection arranged on the weight-printing wheel, near its starting point, in order to operate a switch closing the circuit of an electromagnet designed to release the unit-price key and thus to open the general circuit;

An independent key enabling the weighings, and the reading of the weight and of the price payable, to be effected without printing on the ticket, and which acts on the assembly of switch electromagnets in the same way as the second of the abovementioned contact bands does.

The accompanying drawings show diagrammatically, by way of example but not of limitation, one form of construction of the invention.

Figure 1:
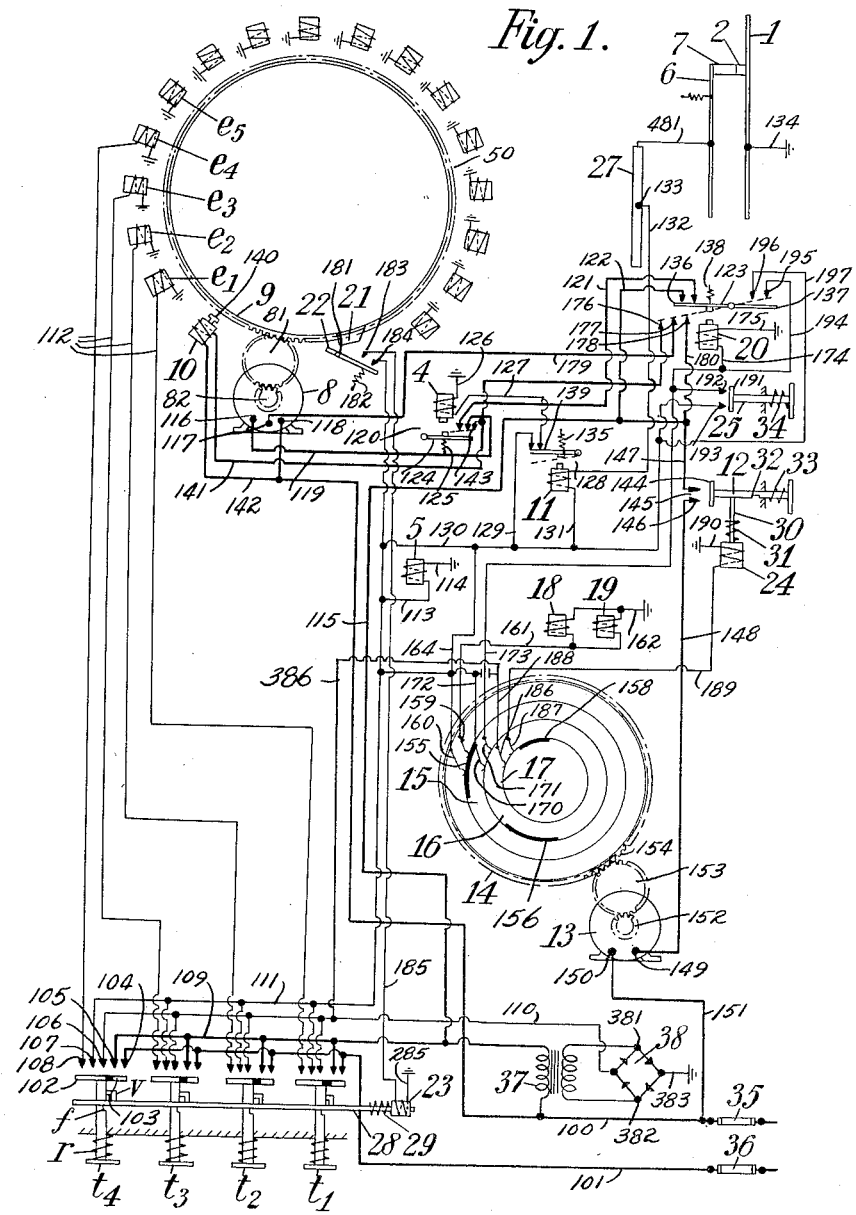
Figure 1 is the electrical circuit diagram of the system.
Figure 2:
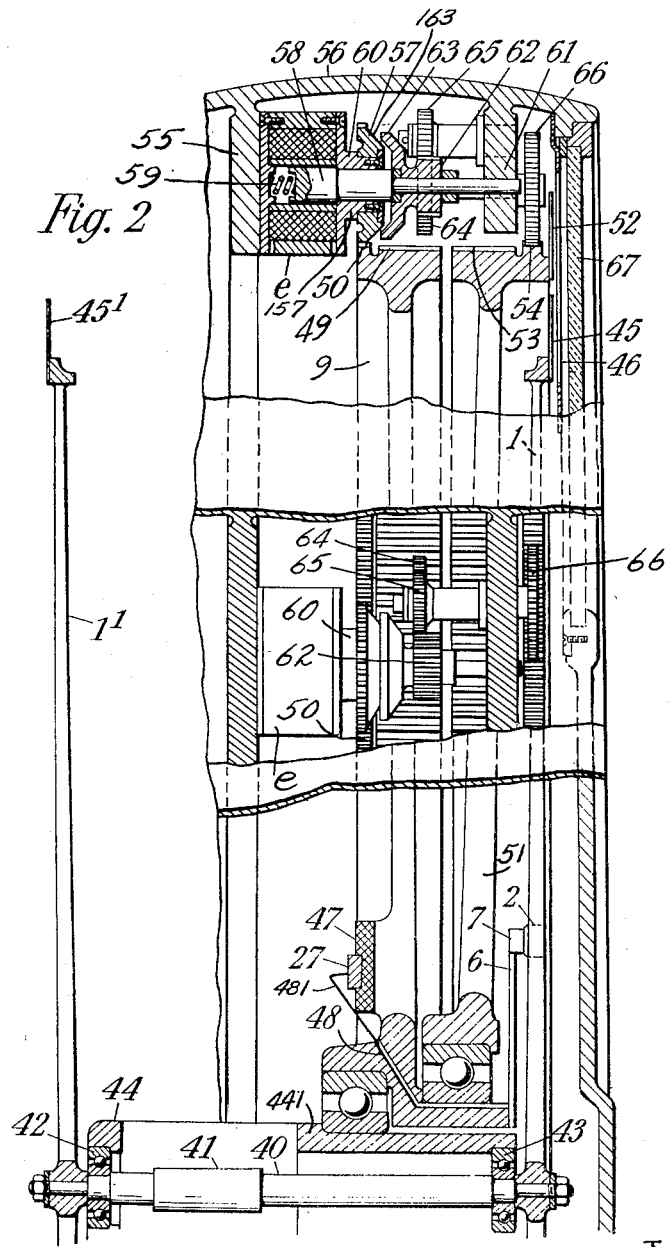
Figure 2 is an axial section elevation of the arrangement for indicating and printing the weights and the prices.

Referring to the drawings, the indicating element of the balance comprises a spindle 40, on the opposite ends of which dials 1, 1' are fixed, the said spindle being rotatable in ball bearings 42, 43 fixed to the frame 44. The spindle 40 is connected at 41 to the weight-supporting element of the balance by suitable operating mechanism of any known kind (not shown) so that the dials 1, 1' are rotated with the spindle 40 through an angle corresponding to the weight of the goods. The whole of the indicating and recording apparatus is enclosed in a casing 56 provided with a transparent glass window 67, the dial 1 comprising a graduated scale 45 which moves behind the window 67 and co-operates with an index or pointer 46 fixed to the casing 56. The dial 1' is provided with a graduated scale 45' for co-operation with a second index (not shown) to enable the weight to be read off from either side of the balance.

The frame 44 comprises a bearing support 441 on which turns the wheel 9 for printing the weights. This wheel supports a base 47, made of electrically insulating material, into which is fixed the contact strip 27, from which starts an electrical conductor 481 which passes through a duct 48 provided in the hub of the wheel 9 and leads to the index 6 fixed on the hub of the wheel 9. The rim of the latter carries type elements 49 for printing the weight on a ticket, and at 50 is provided with gear teeth.

The hub of the wheel 9 is so arranged as to serve as an axis of rotation for a wheel 51 for indicating and printing the price to be paid. At 52 this wheel carries the price graduation, which moves in front of the index 46, and its rim carries in relief type elements 53 by which the price is printed on a ticket. The rim of the wheel 51 is also provided with gear teeth 54.

Around the wheel 9, and fixed on a rim 55 rigid with the casing 56, are arranged the electro-magnets $e$, each corresponding to a unit price of a price-selecting keyboard.

Each electromagnet carries a toothed pinion 57, always in mesh with the wheel 9 and freely rotatably around a boss 157 on the cover 60 of the magnet. Arranged in its core is a spindle 58, subjected to the action of a spring 59, which pushes it back when the electro-magnet is not excited. This spindle 58, which slides with slight friction in the cover 60 of the electro-magnet and in a rim 61 rigid with the casing, carries a toothed pinion 62 which is freely rotatable thereon and rigid with the female clutching cone 63, which is applied to the male clutching cone 163 of the toothed pinion 57 when the electromagnet is excited.

The pinions 57 and 62 form part of a transmission mechanism, including a train of toothed wheels 64, 65, 66, which drives the teeth 54 of the price wheel 51, each train of toothed wheels having a different transmission ratio computed for a different unit price.

The toothed part 50 of the weight wheel 9 is driven by the electric motor 8 through gears 81, 82.

At each weighing, all the pinions 57 of the electromagnets are driven by the weight wheel 9, but only the wheel train that corresponds to the electro-magnets that has been excited is clutched to its associated pinion 57.

A printing arrangement, known in itself, is installed under the printing wheels in order to print at the same time the weight and the price payable on a strip of paper, which is unrolled by a known process. The ticket will be capable of bearing two graduation scales: the graduation of the weight scale gives divisions equal to one-thousandth part of the force of the balance, the graduation of the price scale giving divisions equal to small monetary units. A double arrow, printed between the two graduations, indicates the weight of the goods and the price to be paid.

The recording mechanism is operated electrically, in the embodiment illustrated, by current from a source of alternating current supplied to conductors 100, 101 which are provided with fuses 35, 36, respectively, to protect the electrical installation, the motor 8 being driven by alternating current while the magnets $e$ and various other control magnets are energised by direct current supplied by a rectifier 38. The operation of the recording mechanism is initiated by depressing one of a series of price-selecting keys $t_1$, $t_2$, $t_3$, $t_4$, after the dials 1, 1' have been moved into the position of equilibrium corresponding to the weight of the goods.

Each price-selecting key is provided with two bridging conductors 102, 103 which are insulated from one another, the bridging conductor 103 coacting with a pair of contacts 104, 105, while the bridging conductor 102 coacts with three contacts 106, 107, 108. Each key is maintained in its inoperative position by means of a spring $r$, the stem of the key being provided with a notch $f$ adapted to receive a latching projection $v$ rigid with a bar 28 which is displaceable lengthwise under the action of a spring 29 when one of the keys is depressed, so as to lock the said key in its depressed position and prevent the other keys from being operated. The bar 28 is retracted to release the keys after the ticket has been printed, by means of an electro-magnet 23, as hereinafter described. The contacts 104, 105 are connected in parallel, respectively, to the conductors 101 and 109, so that when one of the price-selecting keys is depressed, the conductor 109 is connected to the input conductor 101.

The conductor 109 is connected to one end of the primary winding of a transformer 37, the other end of which is connected to the conductor 100, so that when the conductor 109 is connected to the conductor 101, the primary of the transformer will be energised. The secondary of the transformer 37 is connected to the input poles 381, 382 of the rectifier 38, one output pole of which is earthed through a conductor 383, while the other output pole is connected by a conductor 110 to the contacts 106. The contacts 107 are connected in parallel to a conductor 111, while the contacts 108 by conductors 112 to one end of the winding of the respective magnets $e$, the other end of which is earthed. The conductor 109 is also connected to a conductor 115 which, together with the conductor 100, serves for supplying alternating current to the motor 8.

Thus, when one of the keys $t_1$, $t_2$, $t_3$, $t_4$ is depressed, the primary of the transformer 37 will be energised owing to the conductor 109 being connected to the conductor 101 through the contacts 104, 105 and the bridging conductor 103 of the depressed key. The motor 8 will also be capable of operation by alternating current supplied through the conductors 100, 115 under the control of electro-magnets 4, 11 and 20. At the same time, the conductor 110 will be connected through the contacts 106, 107 and the conductor 102 to the conductor 111, and by the contacts 106, 108 and the conductor 102 to the conductor 112 connected to the winding of the magnet $e$ associated with the depressed price-selecting key. The said magnet $e$ will thereby be energised by current from the rectifier 38 through the conductor 112, the earth return and conductor 383.

The magnets 4, 11, 20, as well as the other control magnets hereinafter described, are supplied with current from the rectifier 38 through the conductor 111 and an earth return connection. One of these control magnets, i. e. the magnet 5 serves for locking the indicating dials 1, 1' by mechanism well known but not herein shown in the position of equilibrium corresponding to the weight of the goods, its winding being earthed at one end by a conductor 114 and connected to the conductor 111 at the other end by a conductor 113.

The motor 8 is provided with three input terminals 116, 117, 118, the terminal 118 being directly connected to the conductor 100. The terminal 116 is connected through a conductor 119, a starting switch 120, a conductor 121, a reversing switch 123 and a conductor 122 to the conductor 115. The reversing switch 123 comprises a two-armed switch lever, the arms 136, 137 of which are insulated from one another, the said lever being maintained by means of a spring 138 in the position shown in Fig. 1 to close the motor supply circuit through the arm 136 and the conductors 121, 122, this being the position of the switch for forward rotation of the motor 8 to set the printing wheel 9 for printing the weight of the goods.

The switch arm 124 of the starting switch 120 forms the armature of the magnet 4, the winding of which is earthed at one end through a conductor 126 and connected at the other end by a conductor 127 through a circuit-breaker switch 128 and conductors 129, 130 to the conductor 111. The arm 139 of the switch 128 is normally held in the position shown by means of a spring 135, so as to close the circuit of the winding of the magnet 4 through the conductors 127 and 129, whereby the magnet 4 is energised by current from the rectifier 38 as soon as the conductor 111 is connected to the conductor 110. By this means the starting switch is closed when one of the price-selecting keys is depressed and the motor 8 is supplied with current to rotate it in the forward direction.

The dial 1 is earthed through a conductor 134 and carries a contact stud 2 which in the zero position of the dial 1 and wheel 9 is in conducting engagement with the stud 7 which is fixed on the index 6 fixed on the hub of the wheel 9. The contact strip 27 coacts with a contact member 133 which is connected by a conductor 132 to one end of the winding of the magnet 11, the other end of which is connected by a conductor 131 and the conductor 130 to the conductor 111. On the dial 1 being angularly displaced by the weight of the goods, the stud 2 moves out of engagement with the stud 7 and remains out of engagement therewith until the wheel 9 has turned through the same angle as the dial 1, when the stud 7 moves into engagement with the stud 2. By this means the magnet 11 is energised by current from the rectifier 38 through the circuit comprising the conductor 111, the conductors 130, 131, the magnet winding, conductor 132, contact member 133, strip 27, conductor 481, index 6, studs 7, 2, dial 1, conductor 134 and earth return to the conductor 383. The arm 139, which forms the armature of the magnet 11 is thereby moved into the position shown in broken lines, thereby interrupting the circuit of the magnet 4 and allowing the switch arm 124 to be moved into the open position under the action of the spring 125, cutting off the supply of current to the motor 8, so that the motor ceases to rotate.

The types 49 are so arranged that when the motor 8 stops the appropriate type corresponding to the angular displacement of the dial 1 will be located at a printing point ready to print the weight on the ticket. At the same time the price printing wheel 51, which has been turned by the wheel 9 through the gear train operated by the pinion 57 associated with the energised magnet e, will be stopped with the appropriate type element 54 corresponding to the weight of the goods and the price per unit weight of the depressed price-selecting key located at the printing point, ready to print the price on the ticket.

The printing wheel 9 is locked in its zero position by a locking member 140 which is retracted by an electro-magnet 10 which is supplied with current through a circuit comprising the conductor 100, conductor 142, magnet winding, conductor 141, and a contact 143 which co-operates with the switch arm 124 and the conductor 121, so that the locking member 140 is withdrawn to release the wheel 9 when the switch 120 is closed to start the motor. When the switch 120 is opened to interrupt the motor circuit, the magnet 10 is de-energised and the locking member 140 again engages the wheel 9 and secures it in its adjusted position.

The printing of the ticket is effected by means of the printing magnets 18, 19 in any suitable known manner with the aid of an ink ribbon, known means being provided for unrolling a strip of paper by the necessary length, as well as the ink ribbon, and for projecting the ticket outwards.

The printing of the ticket is initiated by a key 12 which is normally held in its inoperative position by means of a spring 33 and, on being depressed, is locked by a latching member 30 which engages a notch 32 in the stem of the key under the action of a spring 31. The key 12 is provided with a bridging conductor 144 which co-operates with a pair of contacts 145, 146, the former being connected by a conductor 147 to the conductor 115, and the latter by a conductor 148 to one terminal 149 of an electric motor 13, the other terminal 150 of which is connected by a conductor 151 to the conductor 100, whereby the motor 13 is set in rotation.

The motor 13 drives a commutator wheel 14 through gearing 152, 153 and teeth 154 on the wheel 14, which is provided with three commutator rings 15, 16, 17 having contact strips 155, 156 and 158, respectively. During the initial part of the rotation of the wheel 14, the strip 155 bridges a pair of brushes 159, 160, the former of which is connected by a conductor 161 to one end of the windings of each of the magnets 18, 19, the other ends of which are earthed through a conductor 162. The other brush 160 is connected by a conductor 164 to the conductors 130 and 111, whereby the printing magnets 18, 19 are energised by current from the rectifier 38. After printing the ticket the magnets 18, 19 are de-energised by the strip 155 moving out of conductive engagement with the two brushes 159, 160 and the contact strip 156 then bridges a pair of brushes 170, 171, the former being connected by a conductor 172 to the conductor 111 and the latter by conductors 173, 174 to one end of the winding of the electro-magnet 20, the other end of which is earthed through a conductor 175.

The lever 136, 137 of the reversing switch 123 forms the armature of the magnet 20, which is energised, when the brushes 170, 171 are bridged by the strip 156, by current from the rectifier 38, whereby the switch lever is moved against the action of the spring 138 into the position shown in broken lines in Fig. 1. The supply circuit of the motor 8 through the conductors 121, 122 is now interrupted, the arm 136 bridging the contacts 176, 177, 178. The contact 178 is connected by a conductor 180 to the conductor 115 and the contact 177 by a conductor 179 to the terminal 117 of the motor 8, while the contact 176 is connected to the conductor 141. By this means the magnet 10 is again energised by current supplied through the conductors 100, 115 and the motor 8 is supplied with current from the conductors 100, 115, the motor terminal 117 being connected to the conductor 115 through the conductor 179, contact 177 switch arm 136 and conductor 180. The motor when thus supplied with current rotates in the reverse direction and, the locking member 140 being released from the wheel 9 by the magnet 10, the wheels 9 and 51 are returned to their initial zero position.

A projection 21 on the wheel 9 is arranged to actuate the lever 181 of a switch 22 against the action of a spring 182, so as to bridge a pair of contacts 183, 184 when the wheel 9 moves into its zero position. The contact 184 is connected to the conductor 111 and the contact 183 is connected by a conductor 185 to one end of the winding of the magnet 23, the other end of which is earthed through a conductor 285. By this means, the magnet 23 is energised and withdraws the bar 28 from the price-selecting keys, allowing the depressed key to return to its inoperative position, thereby interrupting the various supply circuits connected to the rectifier 38 through the conductor 111.

The magnets e, 4, 5, 10, 20 and 23 are now deenergised, so that the supply of current to the motor 8 is interrupted and the wheel 9 is locked in its zero position by the member 140, the dials 1, 1' being also released to allow them to return to the zero position. At the same time the switch lever 139 again closes the circuit of the magnet winding 4 through the conductors 127 and 129, while the switch lever 136, 137 returns to the position shown in full lines, so as to enable the motor 8 to rotate in the forward direction on depression of a price-selecting key in the manner above described.

The latching member 30, however, remains in engagement with the notch 32 in the stem of the key 12 and the motor 13 continues to rotate the wheel 14. When the wheel 14 has turned through nearly a complete revolution, the contact strip 158 bridges a pair of brushes 186, 187, the former of which is connected by conductors 188 and 386 to the conductor 110 and the latter by a conductor 189 to one end of the winding of the magnet 24, the other end of which is earthed through a conductor 190. The magnet 24 is thereby energised and withdraws the member 30 from the notch 32 in the stem of the key 12, so that the said key returns to its inoperative position under the action of the spring 33 to interrupt the supply circuit of the motor 13. The wheel 14 is thus stopped with the contact strips 155, 156, 158 in the required positions to control another sequence of operations, commencing with the energising of the magnets 18, 19, on being rotated through a further revolution.

A key 25 is also provided for enabling the weight and price to be indicated without the recording mechanism being operated. This key, which is normally held in its inoperative position by means of a spring 34, is provided with a bridging conductor 191 which coacts with two contacts 192, 193, the latter being connected to the conductors 130 and 111, while the former is connected to the conductor 174. A conductor 194 connects the conductor 174 to a contact 195 which is bridged to a contact 196 by the switch arm 137 when the magnet 20 is energised. The contact 196 is connected by a conductor 197 to the conductors 130 and 111.

When the wheels 9 and 51 have been turned by the motor 8 to the positions corresponding to the weight and price of the goods, and it is desired to return the said wheels to their zero positions after reading off the weight and price on the graduated scales 45 and 52, without printing a ticket, it is only necessary to depress the key 25. By depressing the key 25, the circuit of the winding of the magnet 20 is closed, through the conductor 191 and the contacts 192, 193. At the same time the supply circuit of the motor 8 is closed through the conductors 179, 180 and the motor rotates the wheels 9 and 51 back to their zero positions, the depressed price-selecting key being released, whereby all the control magnets are de-energised, including the magnet 20, and the apparatus is again ready to be operated in the manner above described, on the depression of a price-selecting key. The switch arm 137 and contacts 195, 196 serve for maintaining the magnet 20 energised after the key 25 has been released, until the depressed price-selecting key returns to its inoperative position.

The mechanisms for weighing, for computing the price to be paid, and for printing and distributing tickets, are completely independent of one another, so that the precision and sensitivity of the balance cannot be influenced in any way. Weighing is still possible if the calculating and printing mechanism no longer functions in the case of failure of the electric current for example.

I claim:

1. Apparatus for indicating and recording weight and price in weighing balances, comprising the combination of a load-influenced rotary weight-indicating element, a weight-printing wheel arranged for rotation coaxially with said weight-indicating element and having a succession of type elements arranged circumferentially thereon, actuating means for said printing wheel for imparting rotary motion thereto, and controlling means operatively connected to said weight-indicating element for arresting the weight-printing wheel at the required position to record the weight shown by said indicating element, with a price-printing wheel arranged for rotation coaxially with the weight-printing wheel and having a succession of type elements arranged circumferentially thereon for printing progressively increasing prices, gear teeth arranged circumferentially on said weight-printing and price-printing wheels, a plurality of gear transmission mechanisms interposed between said weight-printing and price-printing wheels, each of said mechanisms including a gear pinion meshing with the teeth on the weight-printing wheel and a gear pinion meshing with the teeth on the price-printing wheel and clutching devices for establishing operative relationship between said printing wheels through the respective transmission mechanisms, the velocity ratio of said transmission mechanisms progressively increasing in accordance with progressively increasing prices per unit of weight so as to enable the price-printing wheel to be turned through correspondingly increasing angles for the same angular displacement of the weight-printing wheel, and individual operating devices for said clutching devices having manual actuating means for enabling the price-printing wheel to be rotated through a selected angle to record the total price of the weight of the goods at a specific price per unit of weight.

2. Apparatus for indicating and recording weight and price in weighing balances, comprising in combination, a load-influenced rotary weight-indicating element, a weight-printing wheel arranged for rotation coaxially with said weight-indicating element and having a succession of type elements arranged circumferentially thereon, an electric motor in driving connection with said printing wheel, a supply circuit including a starting switch for connecting said motor to a source of current, a plurality of price-selecting keys corresponding to progressively increasing prices per unit of weight, a price-printing wheel arranged for rotation coaxially with the weight-printing wheel and having a succession of type elements arranged circumferentially thereon for printing progressively increasing prices, a plurality of gear transmission mechanisms interposed between said weight-printing and price-printing wheels, each of said transmission mechanisms including a clutching device arranged to establish operative relationship between said printing wheels through said transmission mechanism, the velocity ratio of the respective transmission mechanisms progressively increasing in accordance with progressively increasing prices per unit of weight, individual operating devices for said clutching devices operated by the respective price-selecting keys, to enable the price-printing wheel to be turned through different angles for the same angular displacement of the weight-printing wheel and in accordance with the chosen price-selecting key, electro-magnetic operating means for closing said switch, circuit closing means operated by said price-selecting keys for the circuit including said electro-magnetic operating means for completing the circuit through the electro-magnetic operating means on any one of said keys being actuated, and circuit-breaking means operated by the weight-printing wheel for the circuit including the electro-magnetic operating means for breaking the circuit when the weight-printing wheel has moved into the required position to record the weight shown by the weight-indicating element.

3. Apparatus for indicating and recording weight and price in weighing balances, comprising in combination, a load-influenced rotary weight-indicating element, a weight-printing wheel arranged for rotation coaxially with said weight-indicating element and having a succession of type elements arranged circumferentially thereon, a reversible electric motor in driving connection with said weight-printing wheel, a supply circuit for connecting said motor to a source of current and including switching means for closing said circuit for rotation of the motor to turn the weight-printing wheel into the required position to record the weight shown by the indicating element, switching means for closing the circuit for rotation of the motor in the reverse direction to return the weight-printing wheel to its initial position, a plurality of price-selecting keys corresponding to progressively increasing prices per unit of weight, a price-printing wheel arranged for rotation coaxially with the weight-printing wheel and having a succession of type elements arranged circumferentially thereon for printing progressively increasing prices, a plurality of gear transmission mechanisms interposed between said weight-printing and price-printing wheels, each of said transmission mechanisms including a clutching device connecting said printing wheels through said transmission mechanism, the velocity ratio of the respective transmission mechanisms progressively increasing in accordance with progressively increasing prices per unit of weight, individual operating devices for said clutching devices controlled by the respective price-selecting keys, to enable the price-printing wheel to be turned through different angles for the same angular displacement of the weight-printing wheel and in accordance with the chosen price-selecting key, operating means connected to each of said price-selecting keys and actuating the first-mentioned switching means to close the motor circuit to turn the weight-printing wheel to the recording position, and means including a control key for operating the second-mentioned switching means to close the motor circuit for reverse rotation of the weight-printing wheel to its initial position.

4. Apparatus for indicating and recording weight and price in weighing balances, comprising in combination, a load-influenced rotary weight-indicating element, a weight-printing wheel arranged for rotation coaxially with said weight-indicating element and having a succession of type elements arranged circumferentially thereon, a plurality of price-selecting keys corresponding to progressively increasing prices per unit of weight, a price-printing wheel arranged for rotation coaxially with the weight-printing wheel and having a succession of type elements arranged circumferentially thereon for printing progressively increasing prices, a plurality of gear transmission mechanisms interposed between said weight-printing and price-printing wheels and having progressively increasing velocity ratios corresponding to the prices per unit of weight of the respective price-selecting keys, each of said transmission mechanisms including a clutching device arranged to establish operative relationship between said printing wheels through said transmission mechanisms, individual operating devices for said clutching devices operated by the respective price-selecting keys, an electric motor in driving connection with said weight-printing wheel, a supply circuit including a switch for connecting said motor to a source of current, electro-magnetic operating means for closing said switch, circuit-closing means operated by said price-selecting keys for the circuit including said electro-magnetic operating means, a circuit-breaker switch for the circuit including said electro-magnetic operating means, said circuit-breaker switch having electro-magnetic operating means therefor, and contacts on the weight-indicating element and weight-printing wheel arranged to close the circuit through the electro-magnetic operating means of the circuit-breaker switch when the weight-printing wheel is located in the required position to record the weight of the goods.

LEÒN ANTOINE NICAISE.

REFERENCES CITED

The following references are of record in the file of this patent:

UNITED STATES PATENTS

| Number | Name | Date |
|---|---|---|
| 1,360,186 | Crane | Nov. 23, 1920 |
| 1,954,955 | Siebers | Apr. 17, 1934 |
| 1,988,072 | Depenbrock | Jan. 15, 1935 |
| 2,116,086 | Van Berkel | May 3, 1938 |
| 2,173,575 | Binns | Sept. 19, 1939 |
| 2,199,010 | Robb | Apr. 30, 1940 |

FOREIGN PATENTS

| Number | Country | Date |
|---|---|---|
| 472,959 | England | Sept. 30, 1937 |